Figure 1:
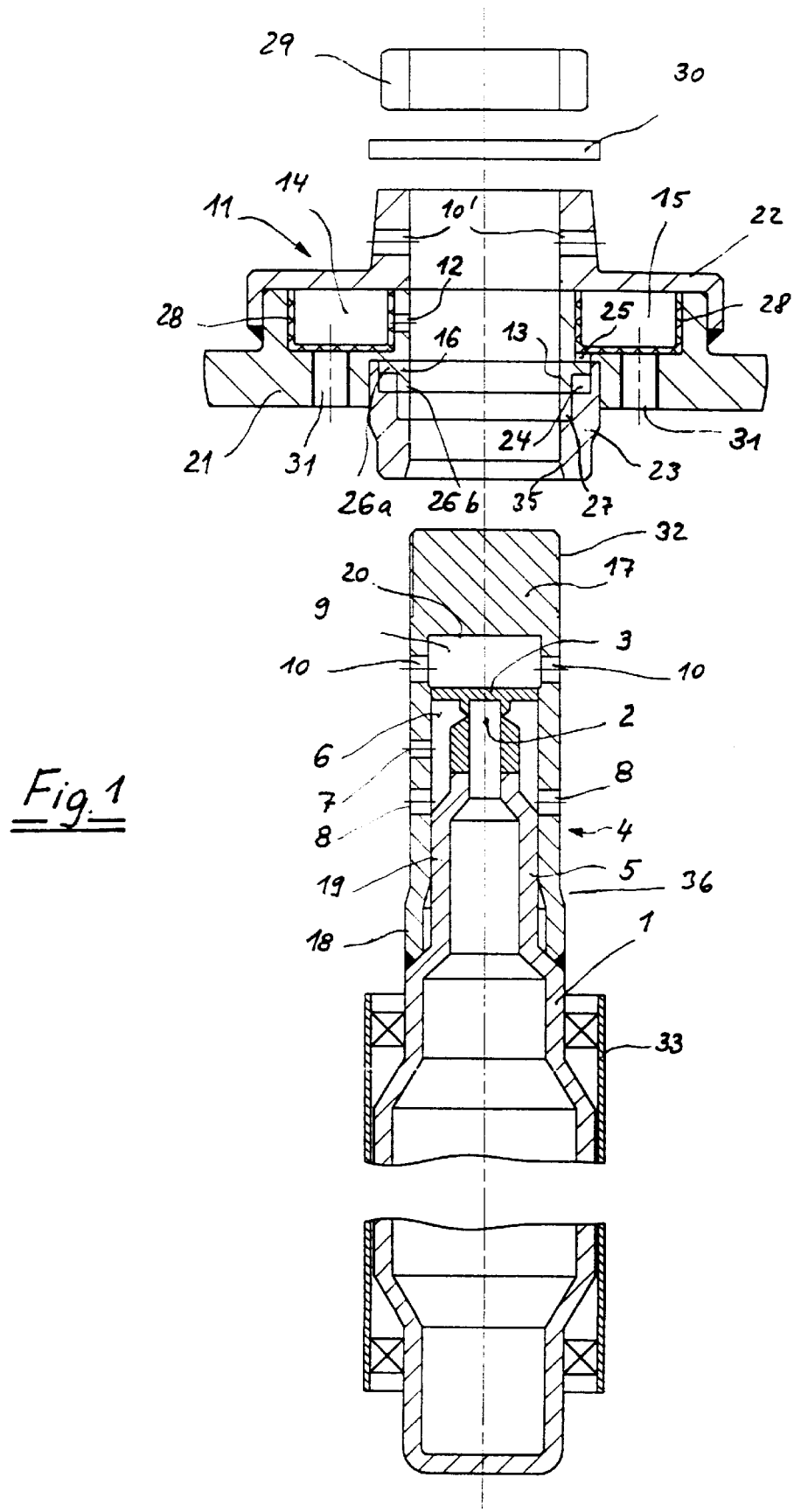

United States Patent [19]
Braunschädel

[11] Patent Number: 6,056,317
[45] Date of Patent: May 2, 2000

[54] DEVICE FOR INFLATING A GAS BAG

[75] Inventor: Axel Braunschädel, Goldbach, Germany

[73] Assignee: TRW Automotive Safety Systems GmbH, Aschaffenburg, Germany

[21] Appl. No.: 09/186,689

[22] Filed: Nov. 5, 1998

[30] Foreign Application Priority Data

Nov. 7, 1997 [DE] Germany .......................... 297 19 783

[51] Int. Cl.$^7$ .................................................. B60R 21/16
[52] U.S. Cl. .......................................... 280/737; 280/741
[58] Field of Search ..................... 280/737, 741

[56] References Cited

U.S. PATENT DOCUMENTS

| | | | |
|---|---|---|---|
| 4,268,065 | 5/1981 | Granig | 280/737 |
| 4,288,005 | 9/1981 | Soo-Hoo | 280/737 |
| 5,611,567 | 3/1997 | Hoo | 280/737 |
| 5,620,204 | 4/1997 | Frey | 280/737 |
| 5,854,441 | 12/1998 | Metzger | 280/737 |

*Primary Examiner*—Kenneth Rice
*Attorney, Agent, or Firm*—Tarolli, Sundheim, Covell, Tummino & Szabo L.L.P.

[57] ABSTRACT

For rapid inflation of a gas bag a pressurized gas container has an outlet opening closed by a closure disc adapted to be blown off to free the outlet opening. An intermediate housing has an interior space which is divided by the closure disc into a pressure chamber provided with inlet openings for gaseous combustion products of a propellant charge and an outflow space having outlet openings for a gas mixture for filling the gas bag. A pair of propellant charges are separated from each other in a housing surrounding the intermediate housing. An accommodation space for the first propellant charge is directly connected with the pressure chamber through an open conduit. A conduit for communication of an accommodation space for the second propellant charge with the pressure chamber is closed by a closure element. The closure element is maintained in a closure position blocking the conduit at least during ignition of said first propellant charge, and is movable into an opening position by pressure arising on ignition of the second propellant charge to free the conduit.

15 Claims, 2 Drawing Sheets

DEVICE FOR INFLATING A GAS BAG

The present invention relates to a device for rapid inflation of a gas bag.

Devices with a rapidly inflatable gas bag are employed on a large scale in motor vehicles for the purpose of protecting the occupants from an impact on car body parts when the vehicle in the case of an accident is exposed to forces acting from outside which cause significant changes in speed, in particular negative accelerations in the driving direction. In such a situation, correspondingly designed sensors will trigger a signal which causes ignition of a propellant charge, the gaseous combustion products of which inflate a gas bag in a short time, i.e. within 10 to 30 milliseconds. As an alternative, a compressed gas container may be opened, or also a filling gas mixture coming from a compressed gas container and from the combustion products of a propellant charge may be provided. The inflated gas bag ideally serves in all cases as a plastically deformable buffer, catching the occupant's body which is accelerated relative to the car body and protecting from injuries.

On designing such devices, one has to choose a specific gas bag volume which, of course, cannot cover all possible crash situations optimally. A specific gas bag volume can be a compromise only, especially with regard to the differing body weights of the occupants, lying in the range between 50 and 100 kg. In recent times, however, there have been made attempts to achieve a better adaptation with respect to this, by automatic regulation of the inflation behavior.

The inflation behavior, too, can be influenced by design. Due to the short reaction times, inflatable side bags, for example, have to be filled substantially quicker than front bags. It is true that the inflation process can be influenced within certain limits by adjustment of the amount of propellant, the compressed gas volume and the cross-sections of throttling means in the inflow area, but it is impossible to achieve an optimum adaptation because on the one hand, the triggering signal necessarily permits only a simple decision adapted to a predetermined limiting value and, on the other hand, the pressure profile during the inflation phase cannot be arbitrarily adjusted, as here additionally some other parameters have to be taken into consideration.

It has already been proposed to provide a gas bag with two or more propellant charges, which are ignited staggered in time in order to achieve a predetermined pressure profile, or are ignited individually or in common in response to two or more successive triggering signals, for realizing different inflation volumina.

For both alternatives, one has to accommodate the propellant charges separately from each other, so that they are prevented from influencing each other. On the other hand, the supply of the gaseous combustion products of the propellant charges into the gas bag has to be ensured, for which purpose the flow conduits cannot be constructed so as to be completely separated from each other because of reasons of space and costs.

An object of the invention is to provide an inflating device wherein simple means ensure that the second propellant charge is not influenced by an ignition of the first propellant charge and is, in particular, not exposed to the blast wave arising therewith, and wherein on ignition of the second propellant charge a flow path is provided via which the gaseous combustion products of the second propellant charge can flow into the gas bag without undue restriction.

According to the invention the device for rapid inflation of a gas bag comprises a pressurized gas container with an outlet opening closed by a closure disc adapted to be blown off to free the outlet opening. An intermediate housing, in which an end of the pressurized gas container at its outlet side is arranged, has an interior space which is divided by the closure disc into a pressure chamber provided with inlet openings for gaseous combustion products of a propellant charge and an outflow space having outlet openings for a gas mixture for filling the gas bag. A housing is provided for accomodating at least two propellant charges separated from each other. This housing surrounds the intermediate housing and is provided with conduits arranged for communication with corresponding ones of the inlet and outlet openings of the intermediate housing. Through these conduits the gaseous combustion products of the propellant charges can flow into the pressure chamber and, together with the compressed gas, through the outflow space into the gas bag. An accomodation space for the first propellant charge is directly connected with the pressure chamber through an open conduit. The conduit for communication of the accomodation space for the second propellant charge with the pressure chamber is closed by a closure element. The closure element is maintained in a closure position blocking the conduit at least during ignition of the first propellant charge and is movable into an opening position by pressure arising on ignition of the second propellant charge to free the conduit.

In this arrangement, it is important that the closure element is formed and arranged in such a way that the blast wave on ignition of the first propellant charge is taken up by surrounding housing components without having forces acting on the closure element, which could move the latter in the opening position. On the other hand, the closure element has to be formed and arranged in such a way that it can easily be moved toward the opening position on ignition of the second propellant charge, so that the emerging of the gaseous combustion products of the second propellant charge is not unnecessarily delayed.

Figure 2:
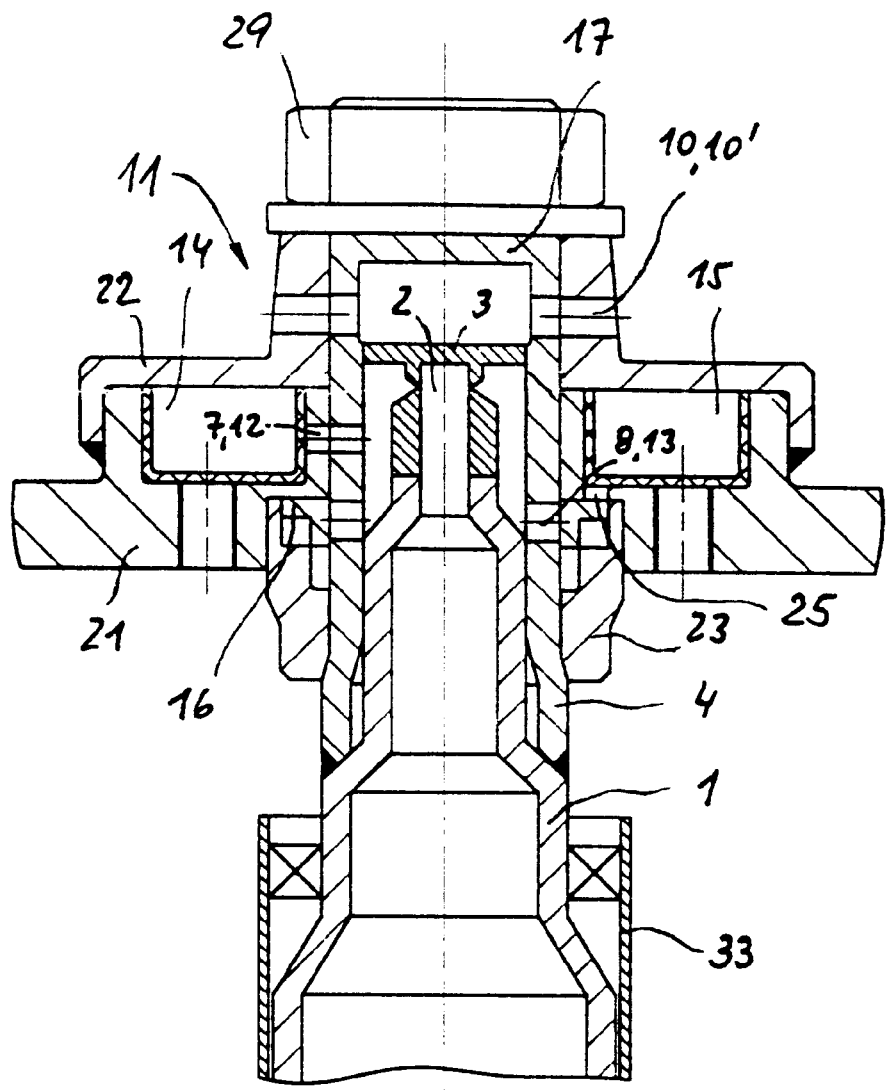

Further details of the invention are explained more clearly with reference to the embodiment illustrated in the FIGS. 1 and 2, wherein:

FIG. 1 shows an embodiment of the invention in an exploded view and in cross-section, FIG. 2 the embodiment according to FIG. 1 in the assembled state.

The embodiment of the invention illustrated in the FIGS. 1 and 2 is designed for being used in a steering wheel of a motor vehicle. The tubular compressed gas container 1 serves here at the same time as a steering wheel which is rotatably mounted in a steering tube 33 by known ways and means. On an end 5 corresponding to its outlet end, the compressed gas container 1 is configured with a double step, a guide portion 19 with a larger diameter being provided and also a portion with a smaller diameter surrounding the outlet opening 2. The outlet opening is closed by a closure disc 3 adapted to be blown off. The closure disc 3 has an external diameter corresponding to the diameter of the guide portion 19. An intermediate housing 4 is placed on the end 5 of the compressed gas container 1 and is fixed to the compressed gas container 1 with its open end 18. The intermediate housing 4 is configured as a tubular part which is closed at one end and has inlet openings 7 and 8 for the gaseous combustion products as well as outlet openings 10 for a gas mixture for filling the gas bag. A pressure chamber 6 is formed between the end 5 of the compressed gas container 1 on its outlet side and the inner wall of the tubular part 17. The pressure chamber 6 is delimited in axial direction by the closure disc 3. The inlet openings 7 and 8 open into this pressure chamber. An outflow space 9 having radially arranged outlet openings 10 is provided between the closed end 20 of the tubular part 17 and the closure disc 3. A thread 32 is formed externally on the closed end of the tubular part 17.

The housing 11 with the accommodation spaces 14 and 15 for the propellant charges comprises a bottom part 21, a cover part 22 and a cylindrical insert 23. All these parts 21, 22, 23 have an internal diameter matching with the outer diameter of the tubular part 17. Conduits 12, 13 and 10' are provided in the housing 11 for communication with the inlet openings 7 and 8 as well as with the outlet openings 10. The conduit 12 leads radially inwards from the accommodation space 14 for the first propellant charge. The conduit 13 is configured as a surrounding, annular conduit 24, in which the closure element 16 is arranged which has a radial part 26a and an axial part 26b. The closure element 16 closes off an axial bore 25 leading from the accommodation space 15 for the second propellant charge to the annular conduit 24. In axial prolongation of the annular conduit 24, an annular space 27 is additionally formed in the cylindrical insert 23. The space 27 serves for guiding and holding the closure element 16 when the second propellant charge is ignited and pressure is exerted on the closure element 16 through the axial bore 25. The accommodation spaces 14 and 15 are equipped with screening inserts 28 for retaining solid combustion products and unburned propellant charge components and are equipped with passage bores 31 in the bottom part 21 of the housing 11, for mounting respective igniters. In this arrangement, the bottom part 21 may be embodied as a separate component and may be connected to the hub portion of a steering wheel. As an alternative, the bottom part 21 itself constitutes part of the steering wheel hub, to which the wheel spokes adjoin.

For assembling the components which are illustrated separately in FIG. 1, the housing 11 is slipped on the tubular part 17, which in turn is firmly connected to the compressed gas container 1 configured as a steering column. Together with the housing 11, the steering wheel is mounted at the same time. Then a disc 30 is placed on the housing 11 and a nut is screwed on the outer thread 32 of the tubular part 17. The end position of the housing 11 relative to the tubular part 17 is defined by known ways and means by conical fitting surfaces 35 and 36.

The manner of operation of the device according to the invention is explained with reference to the assembly illustrated in FIG. 2. On ignition of the first propellant charge arranged in the accommodation space 14, a blast wave arises by which the closure disc 3 is blown off from the compressed gas container 1 and is thrown axially against the closed end of the tubular part 17, so that the compressed gas can flow through the outlet opening 2 and, together with the gaseous combustion products of the first propellant charge, can escape through the outlet opening 10 and the conduit 10' into the gas bag (not shown).

The closure element 16 can be acted upon only in radial direction through the inlet opening 8 and the annular conduit 13, the pressure forces being directly introduced into the cylindrical insert 23, without having axial forces acting on the closure element. Communication with the accommodation space 15 for the second propellant charge can therefore be reliably blocked until the second propellant charge has been ignited. When the second propellant charge is ignited, a blast wave arises which acts on the closure element 16 through the axial bore 25, with the result that the closure element 16 is now moved axially into its opening position to free the flow path through the annular conduit 13 and the inlet openings 8.

So there is provided a device in which two propellant charges can be ignited independently from each other. This provides a way to ignite the second propellant charge after the first propellant charge in order to achieve a specific pressure profile, as well as a way to either have only the first or both propellant charges react in response to crash parameters.

The idea of the invention may be applied also to such devices in which more than two propellant charges are used to inflate a gas bag, which of course means to accept constructional extra expenses, but with the constructional principles explained above being applicable without any problem.

I claim:

1. A device for rapid inflation of a gas bag, comprising
    a pressurized gas container with an outlet opening closed by a closure disc adapted to be blown off to free said outlet opening,
    an intermediate housing in which an outlet end of the pressurized gas container is located, said intermediate housing having an interior space which is divided by the closure disc into a pressure chamber provided with inlet openings for gaseous combustion products of a propellant charge and an outflow space having outlet openings for a gas mixture for filling the gas bag, and
    a housing accomodating at least two propellant charges separated from each other, said housing surrounding the intermediate housing and being provided with conduits arranged for communication with corresponding ones of the inlet and outlet openings of the intermediate housing, through which conduits the gaseous combustion products of the propellant charges can flow into the pressure chamber and, together with the compressed gas, through the outflow space into the gas bag,
    said housing having an accommodation space for the first propellant charge which is directly connected with the pressure chamber through an open conduit, the conduit for communication of the accommodation space for the second propellant charge with the pressure chamber being closed by a closure element, said closure element being maintained in a closure position blocking said conduit at least during ignition of said first propellant charge and being movable into an opening position by pressure arising on ignition of the second propellant charge to free said conduit.

2. The device according to claim 1, wherein the compressed gas container is tubular with a tapered outlet end and a central, axial outlet opening which is closed by the closure disc adapted to be blown off, said disc having a diameter which is larger than the diameter of the tapered outlet end of the compressed gas container, the outlet opening being surrounded by said tapered outlet end.

3. The device according to claim 2, wherein the intermediate housing has a tubular part which has a closed end and an open end, the open end being placed on a guide portion provided on the compressed gas container and connected with the compressed gas container.

4. The device according to claim 3, wherein the closure disc has the same diameter as the guide portion of the compressed gas container.

5. The device according to claim 3, wherein the pressure chamber is formed between the outlet end of the compressed gas container and the inner wall of the intermediate housing, the outlet end being further reduced in diameter compared with the guide portion, the pressure chamber being delimited in axial direction by the closure disc.

6. The device according to claim 5, wherein the outflow space in the intermediate housing is formed between the closure disc and the closed end of the tubular part and radially arranged outlet openings are provided in the tubular part.

7. The device according to claim 6, wherein the pressure chamber is connected with the accommodation spaces for the propellant charges through radial inlet openings in the tubular part.

8. The device according to claim 7, wherein the inlet openings for the first and second propellant charges are arranged in the tubular part with an axial offset, the inlet opening for the first propellant charge opening into the pressure chamber at a location between the closure disc and the inlet openings for the second propellant charge.

9. The device according to claim 3, wherein the housing for the propellant charges comprises a bottom part, a cover part and a cylindrical insert, said parts each having an internal diameter matching with the outer diameter of the tubular part, two separately arranged accommodation spaces for the propellant charges being formed between the bottom part and the cover part, the bottom part having two passage holes each for mounting an igniter of an associated propellant charge.

10. The device according to claim 9, wherein a radially extending exit conduit is provided in the housing for connection of the accommodation space for the first propellant charge with the corresponding inlet opening of the intermediate housing and hence with the pressure chamber.

11. The device according to claim 10, wherein an annular surrounding conduit is formed in the housing between the bottom part and the cylindrical insert, said conduit being open to the inlet openings for the second propellant charge and being connected with the accommodation space for the second propellant charge through an axial bore, said closure element being annular and being axially movably accomodated in the surrounding conduit, said closure element in its closure position closing the axial bore.

12. The device according to claim 11, wherein the annular closure element is L-shaped in cross-section with a radial part and an axial part, the radial part closing off the axial bore and the axial part being guided in an axially extending annular space which is formed in the cylindrical insert.

13. The device according to claim 1, wherein said housing is associated with a motor vehicle steering wheel and said compressed gas container is associated with and at least partially accomodated in the steering wheel column.

14. The device according to claim 1, wherein the intermediate housing is provided with an external thread at one end, the housing for the propellant charges and the steering wheel being connected to the compressed gas container by means of a nut screwed on the intermediate housing.

15. The device according to claim 14, wherein a bottom part of said housing is arranged in the hub portion of a steering wheel.

* * * * *